United States Patent [19]

von Bonin et al.

[11] 4,169,866

[45] Oct. 2, 1979

[54] POLYMER SYSTEMS CONTAINING POLYCARBODIIMIDES AND THERMOPLASTIC POLYMER

[75] Inventors: Wulf von Bonin, Leverkusen; Wolfgang Oberkirch, Cologne; Ulrich von Gizycki, Leverkusen, all of Fed. Rep. of Germany

[73] Assignee: Bayer Aktiengesellschaft, Fed. Rep. of Germany

[21] Appl. No.: 784,276

[22] Filed: Apr. 4, 1977

[30] Foreign Application Priority Data

Apr. 8, 1976 [DE] Fed. Rep. of Germany ....... 2615343

[51] Int. Cl.$^2$ ...................... C08L 67/00; C08L 69/00; C08L 77/00; C08L 79/00
[52] U.S. Cl. ...................................... 525/131; 260/13; 525/129; 525/130; 525/424; 525/440; 525/458; 521/85; 525/460; 525/452
[58] Field of Search ............... 260/823, 860, 874, 873, 260/858, 857 PG, 857 PE

[56] References Cited

U.S. PATENT DOCUMENTS

| | | | |
|---|---|---|---|
| 3,835,098 | 9/1974 | Brown | 260/75 N |
| 3,963,801 | 6/1976 | Su | 260/873 |
| 4,010,222 | 3/1977 | Shih | 260/873 |
| 4,052,360 | 10/1977 | Berardenilli | 260/857 PE |
| 4,060,664 | 11/1977 | McGuire | 428/336 |
| 4,071,503 | 1/1978 | Thomas | 260/75 N |
| 4,110,302 | 8/1978 | Thomas | 260/860 |
| 4,113,676 | 9/1978 | Niederst | 260/860 |

FOREIGN PATENT DOCUMENTS

. 1056202 1/1967 United Kingdom .

*Primary Examiner*—Paul Lieberman
*Attorney, Agent, or Firm*—Connolly and Hutz

[57] ABSTRACT

Thermoplastically processible polymer systems containing a polycarbodiimide as a polymer component.

2 Claims, No Drawings

POLYMER SYSTEMS CONTAINING POLYCARBODIIMIDES AND THERMOPLASTIC POLYMER

This invention relates to thermoplastic multicomponent moulding materials, so-called polymer systems which contain at least one polymeric polycarbodiimide.

Thermoplastic polymer systems containing at least one elastomeric component have been known for some time. In the sense of the present invention such polymer systems are, for example, combinations of hard matrix polymers and more or less elastomeric polymers which elastify the hard and often brittle matrix.

Typical polymer systems of this kind are, for example, mixtures of polystyrene or styrene-acrylonitrile copolymers with butadiene copolymers, ethylene-vinyl acetate copolymers, ethylene-propylene copolymers or polyacrylates, as well as mixtures of polyvinylchloride, a combination of PVC with ethylenevinyl acetate copolymers or polyacrylates.

Polymer systems show particularly good mechanical properties when their synthesis involves grafting processes where particularly favourable compatibility of the elastomeric and the comparatively brittle polymer component are obtained.

The polymer systems are often multiphase systems or multiphase plastics materials. The simplest method of producing such polymer systems is to mix the elastomeric polymer component with the rigid polymer component mechanically, for example in kneaders, screws or rolls. Unfortunately, unsatisfactory mechanical properties are generally obtained in this way. Accordingly, the flexible component is often produced in the presence of all or part of the rigid component or, all or part of the rigid component in the presence of the flexible or elastomeric component, for example by radical polymerisation so that grafting reactions responsible for the good properties of the polymer system can take place.

Known polymer systems satisfy numerous practical requirements, but properties obtainable with a given polymer system are largely fixed, for example in regard to the contribution made by the flexible or elastomeric component, because the chemical nature of its constituents can only be varied to a fairly limited extent.

A polycarbodiimide is used as the flexible or elastomeric component in the polymer systems of this invention.

Polycarbodiimides can be produced by reacting a compound containing at least two isocyanate-reactive hydrogen atoms with a stoichiometric excess of diisocyanates or polyisocyanates so that an isocyanate prepolymer (polyadduct with at least two free terminal isocyanate groups) is formed. A carbodiimide-forming catalyst, for example 1-methyl-1-oxophospholine, can then be added to the isocyanate prepolymer thus produced and the prepolymer can be converted into the corresponding polycarbodiimide with intermolecular elimination of $CO_2$.

In this way all polymer units known in polyurethane chemistry can be utilized in the polycarbodiimide component which constitutes a constituent of the polymer system. The result is an almost incalculably wide range of variation of the polymer systems obtainable in accordance with the invention.

The compounds containing isocyanate-reactive hydrogen atoms used as starting materials for the production of the polycarbodiimide component can be selected from various classes of compounds, for example suitably terminated olefin and diene polymers, polyacetals, polyacetones, polyamides, polyamines, polytetrahydrofurans, polyesters, polycarbonates, polysiloxanes, polysulphides or polyethers based for example on ethylene oxide and/or propylene oxide, i.e. classes of compounds differing widely in their chemical character, and mixtures thereof. The isocyanates include, for example, aliphatic, araliphatic, cyclic or aromatic diisocyanates and, once again, isocyanate prepolymers or isocyanate mixtures.

This alone is evidence of the range of variation of the present invention.

It has been found that the polymer systems outlined above can be made commercially in a simple way due to the use of polycarbodiimides as a polymer component. By way of illustration:

A trifunctional polyether (polypropylene oxide with a molecular weight of about 6000) as the starting material can be converted into a flexible polymer component by:

(a) stoichiometric reaction with a diisocyanate, for example tolylene diisocyanate;

(b) reaction with, for example, excess tolylene diisocyanate to form the prepolymer and further reaction with, for example, a stoichiometric quantity of butane diol to form the high polymer;

(c) reacting the prepolymer with a diamine to form the high polymer;

(d) reacting the prepolymer with water to form the polyurea;

(e) converting the prepolymer into the corresponding trimerisation product by adding a suitable trimerisation catalyst;

(f) converting the prepolymer into a polycarbodiimide by adding a suitable catalyst.

A crosslinked, flexible or elastic polymer which may readily be granulated is obtained by each of the methods described above.

If the granulate thus obtained is impregnated with three times its quantity by weight of a mixture of 30 parts by weight of acrylonitrile and 70 parts by weight of styrene, which also contains a radical initiator, the vinyl monomer mixture is taken up, accompanied by swelling. After the swollen granulate mass has been heated and polymerised to completion, a rigid granulate of the polymer system formed, similar in appearance, is obtained in every case. However, only the granulate produced with the polycarbodiimide obtained by method (f) is thermoplastically processible, for example on rolls or in kneaders, at temperatures as low as 200° C.

This invention relates to thermoplastically processible polymer systems which contain a polycarbodiimide as one of the polymer components.

More particularly, the invention relates to thermoplastically processible polymer systems of vinyl polymers and polycarbodiimides.

Preferably, the invention relates to thermoplastically processible polymer systems which contain at least one polymer component with an elastomeric, flexible character, wherein at least one elastomeric, flexible polymer component is a polycarbodiimide.

The invention further relates in particular to thermoplastically processible polymer systems which contain a polycarbodiimide as at least one of the polymer components, the polycarbodiimide deriving its low glass transition temperature from segments of the following type:

polyacetal, polycarbonate, polylactone, polydiene, polyester and polyether.

In addition, the invention relates to the production of thermoplastically processible polymer combinations which preferably contain vinyl polymers and polycarbodiimides, and to a production process in which formation of the polycarbodiimides is completed in the presence of the vinyl monomers which are subsequently or simultaneously polymerised, or in which polymerisation of the vinyl monomers is carried out in the presence of the preformed polycarbodiimides.

The thermoplastically processible polymer systems are homogeneous or preferably multiphase polymer mixtures of at least two different polymers of thermoplastic character, i.e. in addition to the polycarbodiimides present in accordance with the invention, vinyl polymers, polycondensation polymers, such as, for example, polyesters or polyamides, polyimides, polysiloxanes, polycarbonates, polysulphones, polycarbodiimides, polyphenylene oxides or sulphides or polyaddition polymers, such as polyurethanes, polyureas, polyethers and other polymers, such as polysaccharide polymers, celluloses, proteins or of course even polymer mixtures or combinations.

In the context of the invention, vinyl polymers are polymers and copolymers produced by the polymerization of carbon double bonds in the starting monomers or monomer mixtures. Monomers such as these are, for example, olefins, such as ethylene, propylene, butene, isobutylene, pentene, hexene or even dienes, such as butadiene, chloroprene, isoprene, or halogen olefins such as perfluorethylene, perfluoropropene, vinyl chloride, vinylidene chloride, or allyl compounds, allyl alcohol, allyl acetals or aromatic vinyl compounds such as vinyl toluene, styrene, methyl styrene or other nucleus-substituted styrenes, vinyl pyrrolidone, vinyl acetamide or derivatives of vinyl alcohol such as vinyl formate, acetate, propionate, benzoate or (meth)acrylic acid and its derivatives, such as (meth)acrylonitrile, (meth)acrylic acid esters of, for example methanol, ethanol, propanol, isopropanol, butanol, t-butanol, isobutanol, hexanol, cyclohexanol, (iso)octanol, decanol etc., or maleic acid, fumaric acid, itaconic acid and their partial esters, full esters, polyesters, amides and imides, such as maleic imide, maleic methyl imide, ethyl imide and cyclohexyl imide.

Those vinyl polymers are preferred which are rigid to brittle in character, for example vinyl polymers synthesised essentially from the following monomers or monomer mixtures: methyl methacrylate, vinyl chloride, acrylonitrile, styrene α-methyl styrene and N-methyl maleic imide. Styrene and acrylonitrile are particularly preferred.

However, it is entirely possible for the polymer systems to contain vinyl polymers or copolymers which are tough to flexible at room temperature, for example polyolefins, polydienes or poly(meth)acrylates, such as those which are obtainable by known methods from the monomers and monomer mixtures mentioned by way of example above.

The polymer systems according to the invention should preferably contain at least one elastomeric flexible polymer component. Polymers such as these are said to be flexible or elastomeric when their glass transition temperature is below 0° C. The glass transition temperature should preferably be below −15° C.

In particular, the polymer systems according to the invention should contain a polycarbodiimide with a glass transition temperature below 0° C. as one of the polymer components. A polycarbodiimide is understood to be a compound which has a molecular weight above 1000 and which contains at least two carbodiimide groups in the molecule. Preferred compounds of this type have molecular weights above 10,000 and contain more than two carbodiimide groups in the molecule. The polycarbodiimides may be linear, branched or cross-linked in character.

The polycarbodiimides derive their low glass transition temperature from preferably incorporated segments of the following type: polyacetal, polycarbonate, polyacetone, polydiene, polyester and polyether.

This formulation is associated with the chemical composition of the polycarbodiimides preferably used, because they are preferably produced by using as starting material segments of the above-mentioned type containing isocyanate-reactive hydrogen atoms (cf. page 3).

The segments of the above-mentioned type may be linear or branched and preferably carry the reactive hydrogen atoms at the ends of the chain. The segments should preferably be difunctional or trifunctional with respect to the reactive hydrogen atoms, although higher functionalities are also possible.

The reactive hydrogen atoms may, for example, be contributed by phenol groups, carboxyl groups, amine groups, amide groups, imide groups, reactive C-H-groups, but especially hydroxyl groups, although various groups of the above-mentioned type may, of course, also be present on the segment of the above-mentioned type.

These segments, which preferably contain terminal hydroxyl groups and are preferably difunctional or trifunctional, should have molecular weights above 500, preferably between 1000 and 10,000. They are known in principle to the expert in polyurethane chemistry.

Of the preferred groups mentioned above: polyacetals, polycarbonates, polylactones, polydienes, polyesters and polyethers, the following representatives, which may be used either individually or in admixture as starting material for the production of the polycarbodiimides used in accordance with the invention, are mentioned by way of example: polyacetals of formaldehyde and diols, such as for example diethylene glycol; polycarbonates of diethylene glycol, butane diol or hexane diol; polycaprolactones, OH-terminated polybutadienes; polyesters or mixed polyesters or mixed polyether esters based on dicarboxylic acids and diols, for example terephthalic acid, maleic acid or, preferably, adipic acid, azelaic acid and ethylene glycol, diethylene glycol, butane diol and hexane diol such as, for example, adipic acid polyesters of diethylene glycol or hexane diol; polyethers and mixed polyethers based on tetrahydrofuran, butylene oxide, propylene oxide and ethylene oxide, of the type known from the prior art, for example, from polyurethane chemistry.

Difunctional and trifunctional polyesters, especially polyethers and mixed polyethers based on tetrahydrofuran, ethylene oxide and propylene oxide, are of particular interest in regard to OH-groups present.

For producing the polycarbodiimides used in accordance with the invention, the segments containing reactive hydrogen atoms, especially hydroxyl groups, used as starting materials, as described in the foregoing, are reacted with polyfunctional, especially difunctional, isocyanates in such a way that substantially every reactive group in the starting material reacts with an isocyanate group of the polyisocyanate which is preferably used in a slight molar excess, the corresponding compound with terminal isocyanate functional groups being obtained from the original starting material containing, for example, terminal OH-groups. Excess isocyanate may be removed by distillation, although its presence does not affect the process and may readily be tolerated.

This method of obtaining polymer segments with terminal isocyanate groups is known from polyurethane chemistry and is known as the prepolymer technique. Accordingly, the compounds formed, i.e. polymer segments with terminally attached isocyanate groups, are referred to as isocyanate prepolymers in accordance with the prior art.

These isocyanate prepolymers may then be converted into the polycarbodiimides used in accordance with the invention by the catalysed intermolecular elimination of $CO_2$. Before this process step is discussed, however, it is pointed out that the polyfunctional, preferably difunctional, isocyanates and isocyanate mixtures used for forming the prepolymers may be aliphatic, cycloaliphatic, aromatic or araliphatic in character. The following are mentioned as examples of these isocyanates: hexamethylene or isophorone diisocyanate, tolylene diisocyanates, 4,4'-diphenyl methane diisocyanate, 2,4'- or 2,2'-diphenyl methane diisocyanate, preferably tolylene diisocyanate of various isomers and 4,4'- or 2,4'-diphenyl methane diisocyanates. However, it is also possible to use complex, polyfunctional, preferably difunctional isocyanates of the type obtained, for example, by the dimerisation or trimerisation of diisocyanates or by the prepolymer technique described above from compounds containing reactive hydrogen atoms and difunctional or polyfunctional isocyanates.

The polycarbodiimides used in accordance with the invention are then produced from the isocyanate prepolymers described above by the intermolecular, preferably catalysed elimination of $CO_2$ at temperatures in the range of from 10° C. to 180° C. and preferably at temperatures in the range of from 25° C. to 150° C. Carbodiimide-forming reactions such as these are known from isocyanate chemistry and are best catalysed by compounds which contain phospholine oxide groups, phospholane oxide groups or corresponding compounds containing phospholane or phospholine sulphide or imide groups and which may be soluble or insoluble in the reaction medium. It has proved to be particularly effective to use 1-methyl-1-oxophospholine in quantities of from 0.1 to 2% by weight and preferably in quantities of from 0.3 to 1% by weight, based on the substance to be converted into the carbodiimide.

The carbodiimide-forming reaction is not affected by residues of the polyfunctional isocyanate used in a slight excess for production of the isocyanate prepolymer, because it is co-incorporated in the polycarbodiimide formed. It is even possible to add more isocyanate in order to vary the properties of the polycarbodiimide to be produced. Monoisocyanates result in terminations of the growing polycarbodiimide chain, i.e. they have a regulator function. Diisocyanates are linearly incorporated and more highly functional isocyanates give rise to crosslinking. Each of these effects may be desirable.

On the other hand, the character of the polycarbodiimide formed is, of course, also governed by the structure of the isocyanate prepolymer used as starting material. If it has been produced using a linear polymer segment, for example a polyether or polyester, or if it contains only two isocyanate groups in the molecule, a preferably linear polycarbodiimide can be expected. However, if the isocyanate prepolymer has been produced using branched or more than difunctional polymer segments or using more than difunctional isocyanates, and if it contains more than two isocyanate groups in the molecule, heavily branched or generally crosslinked polycarbodiimides are formed during the carbodiimide-forming reaction.

It has been found that both linear and also branched and crosslinked polycarbodiimides may be used for the purposes of the invention. In this respect, it is surprising that, despite the use of crosslinked polycarbodiimides, the polymer combinations produced with them can be thermoplastically processed particularly well.

It has been found that polycarbodiimides produced from prepolymers of diisocyanates, especially aromatic diisocyanates, and linear difunctional and/or stellatelinear trifunctional polymer segments of the type described above, with molecular weights of from 500 to 10,000 more especially from 1000 to 7000, especially polyesters and/or polyethers, are particularly suitable for the purposes of the invention.

The polycarbodiimide is generally present in the thermoplastic polymer combinations according to the invention in quantities of from 0.5 to 95% by weight, and preferably in quantities of from 10% to 80% by weight based on the total weight of the combination.

In the most simple case, the polycarbodiimides thus obtained may be mixed with the thermoplastic materials intended for combination, for example polyamides, polycarbonates, polysulphones, polyethers, polyesters, polyacetals, vinyl polymers, polysulphides or cellulose esters, by mixing on rolls, in kneaders or in screw machines. To this end, it is best to work at temperatures above 100° C. and below 280° C.

However, the polymer combination according to the invention is preferably produced by forming the polycarbodiimides in the presence of vinyl monomers and, optionally, polymerisation initiators, such as azo compounds, peroxides, and subsequently or simultaneously reacting the latter, or by polymerising vinyl monomers in the presence of the preformed polycarbodiimides. This latter precedure has proved to be particularly practicable. Although the additional use of solvents is possible, it is not generally necessary.

Thus, the polymer combination according to the invention is produced for example by dissolving the preformed isocyanate prepolymer, from which the polycarbodiimide is to be formed, together with the carbodiimide-forming catalyst in the requisite quantity in a vinyl monomer or vinyl monomer mixture, preferably adding a polymerisation initiator, such as azodiisobutyronitrile, dilauroyl peroxide, t-butyl peroctoate, dibenzoyl peroxide, cyclohexanone peroxide, t-butyl hydroperoxide, cumene hydroxyperoxide di-t-butyl peroxide, etc., in quantities of from 0.1 to 3% by weight and preferably in quantities of from 0.2 to 1.5% by weight, based on the vinyl monomer, and optionally regulators, such as for example mercaptans, and subsequently heating the reaction mixture with stirring to temperatures of from 10° C. to 210° C. and preferably to temperatures of from 25° C. to 150° C. until it gels or until the polymerisation reaction is over, optionally in an inert gas atmosphere, for example under nitrogen or $CO_2$, and optionally under elevated pressure. It is also possible to suspend the reaction mixture, especially after distinct gelation has occurred, in water, optionally in the presence of emulsifiers or protective colloids, and to complete the polymerisation reaction in the form of suspension polymerisation.

In a variant of this process, the isocyanate prepolymer required for polycarbodiimide formation may also be produced in the vinyl monomers themselves.

In cases where crosslinked polycarbodiimides are used, the polymer combination according to the invention may be produced with advantage as follows for polycarbodiimide contents of approximately 20% to 95% by weight: the polycarbodiimide is impregnated in preformed, preferably granulated form with the vinyl monomer or monomer mixture which already contains the polymerisation initiator. The vinyl monomer together with the initiator is completely or largely taken up by the polycarbodiimide, accompanied by swelling. For this purpose, it is best to use polymerisation initiators with limited solubility in water. If the vinyl monomer is taken up by the polycarbodiimide so effectively that the swollen granulate particles are still free-flowing, the polymerisation reaction may be carried out in a rotating, heated, optionally coolable drum or stirrer-equipped vessel optionally filled with an inert gas, this process being particularly favourable because no effluent is formed. However, the swollen granulate particles may also be suspended in water after a sufficiently long swelling time, which guarantees uniform distribution of the monomer, optionally in the absence of further protective colloid or emulsifier, and the polymerisation reaction subsequently carried out in the form of suspension polymerisation. The water does not have a harmful effect upon the products formed, but instead provides for effective dissipation of the heat of reaction. The polymerisation reaction takes place almost exclusively in the swollen granulate particles.

The advantage of using preformed polycarbodiimides is that it is possible to work particularly well with additions of reactive vinyl monomers, i.e. monomers of the type which may optionally react with the carbodiimide groups or with isocyanate groups optionally present in the polycarbodiimide or with other reactive groups present in the polycarbodiimide, so that further chemical attachment of the vinyl polymer formed to the polycarbodiimide component of the polymer combination according to the invention could occur in addition to the possible grafting reactions which take place.

Reactive vinyl monomers of the type in question are, for example, (meth)acrylic acid, maleic, fumaric, crotonic, itaconic-linoleic acid, or maleic acid, fumaric acid, itaconic acid semiesters, allyl alcohol, allylamine, hydroxyethyl or hydroxypropyl (meth)acrylate and other vinyl compounds containing Zerewitinoff-active hydrogen atoms. It has been found that reactive vinyl monomers such as these should with advantage be used in small quantities, based on the total amount of vinyl monomer used, i.e. in quantities of from 0 to 45% by weight and preferably in quantities of from 0 to 10% by weight, the range from 0.05 to 1% by weight clearly being sufficient for a certain attachment, whereas quantities in excess of 5% by weight often result in the formation of homogeneous to clear and transparent polymer combinations.

The polymer systems according to the invention are generally opaque masses. Interestingly, initially clear granulates are often obtained in the production of these polymer combinations by the polymerisation of vinyl monomers in the presence of preformed polycarbodiimides, although during thermoplastic processing on rolls, in kneaders or in screw machines, these initially clear granulates ultimately assume an opaque, clearly multiphase character which they retain irreversibly, even after cooling. Accordingly, it is best to subject the products originally obtained by the process to an after-treatment, for example in a screw, on rolls or in a kneader, before they are used. Since this aftertreatment may be carried out during fabrication, i.e. moulding and addition of stabilisers against, for example, light, oxidation and thermal stressing or weathering, or addition of lubricants, dyes, fillers, fibres, blowing agents or aromatic agents, it does not involve any technical disadvantage.

It is possible in accordance with the invention to obtain polymer systems with, for example, outstanding weather resistance, with excellent behaviour under thermal stressing, with extreme toughness, even at low temperatures, with favourable swelling behaviour with respect to oils and with a high resistance to chemicals. They may be hydrophilic or hydrophobic in character. They may be combined with a variety of different polymers or polymer combinations to form mixed systems, for example with styrene-acrylonitrile copolymers, of which the impact strength may thus be increased, with ABS-polymers, with PVCm with poly(meth)acrylates, with polyphenylene ethers or mixtures thereof with, for example, polystyrene, with polyacetals, with polycarbonates, polyurethanes, polyamides and polyolefins or polyolefin copolymers, such as for example, ethylene-vinylacetate copolymers or even with polysaccharide and cellulose thermoplastic materials.

The polymer systems according to the invention may be processed by conventional thermoplastic processing techniques. Depending upon their composition, but generally with increasing polycarbodiimide content, they may vary from rigid-brittle via rigid-tough to tough-elastic and flexible-elastic. They are suitable for a wide range of applications and may be processed into optionally foamed and/or filled and/or fibre-reinforced semi-finished products or end products, mouldings of a variety of different kinds, such as hollow bodies, helms, shafts, tubes, profiles, panels, films, membrane materials for separation purposes, coatings, bristles, baths, hinges, fittings, shoe soles, vehicle tyres, hoses, shock absorbers, adhesives, sealing materials, seals etc., these end products being widely variable to meet special requirements, for example in regard to their material properties and hence to their serviceability.

Mouldings produced from the polymer systems according to the invention may subsequently be thermoplastically processed or machined, in some cases even forged or cold-formed. They may be electroplated and coated by vapour deposition and, in addition may be dyed or lacquered.

In the following examples parts and percentages are by weight unless otherwise indicated.

EXAMPLES

A polymer segment in the form of a bifunctional OH-terminated copolyether of approximately 80% by weight of propylene oxide and approximately 20% by weight of ethylene oxide, OH-number approximately 28, molecular weight approximately 4000 (pigment segment A) and a polymer segment in the form of a trimethylol-propane-started trifunctional OH-terminated copolyether of approximately 20% by weight of ethylene oxide and approximately 80% by weight of propylene oxide, OH-number approximately 28, molecular weight approximately 6000 (polymer segment B), were converted by different methods into substantially similarly crosslinked polymer gels, although the bridges between the polymer segments differed from case to case.

The crosslinked polymers were then granulated and used as a starting material for producing the polymer systems according to the invention and for comparison:

EXAMPLE 1

Comparison Polymer A 500 parts by weight of polymer segment B are thoroughly stirred with 22.5 parts by weight of a commercial-grade tolylene diisocyanate isomer mixture, containing approximately 80% by weight of 1,4-isomer, and 1 part by weight of a basic catalyst, and the resulting mixture is left standing for 22 hours at 60° C. A soft polymer gel is formed.

EXAMPLE 2

Comparison Polymer B

The procedure is as described for Comparison Polymer A, except that 21.8 parts by weight of 1,6-hexamethylene diisocyanate are used as the isocyanate and the quantity of catalyst is doubled. A soft polymer gel is again formed.

EXAMPLE 3

Comparison Polymer C

To begin with, the polymer segment B is converted into an isocyanate prepolymer, hereinafter referred to as prepolymer B. 1293 parts by weight of polymer segment B are stirred for 260 minutes at 80° C. with 208 parts by weight of the isocyanate used in Example 1, prepolymer B producing an NCO-content of 4.8% by weight, as determined by titration.

500 parts by weight of prepolymer B are then thoroughly mixed at 70° C. with 25.8 parts by weight of butane diol and the resulting mixture is left standing at that temperature for about 20 hours. A soft polymer gel is formed.

EXAMPLE 4

Comparison Polymer D

To begin with, polymer segment A is converted into an isocyanate prepolymer which is referred to hereinafter as prepolymer A. 1293 parts by weight of polymer segment A are stirred for 205 minutes at 80° C. with 208 parts of the isocyanate used in Example 1. Prepolymer A with an isocyanate content of 4.7% by weight, as determined by titration, is thereby formed. 500 parts by weight of prepolymer A are then thoroughly stirred with 2.5 parts by weight of a basic trimerisation catalyst for isocyanates, and left standing for about 20 hours at 70° C. A crosslinked soft polymer is formed.

EXAMPLE 5

Polycarbodiimide B Used in Accordance with the Invention 500 parts by weight of prepolymer B are thoroughly stirred with 4 parts by weight of 1-methyl-1-oxophospholine and the resulting mixture is left standing for about 15 hours at 70° C. A soft polymer gel referred to hereinafter as polycarbodiimide B is formed.

The polymers described in Examples 1 to 5 are then all converted in the same way into a polymer combination:

EXAMPLE 6

Production of the Polymer Systems of Examples 6.1a to 6.5b

Variant 6.1–6.5a:

100 parts by weight of the crosslinked polymers according to Examples 1 to 5 in granulated form are thoroughly stirred for 2.5 hours at room temperature with a solution of 210 parts by weight of styrene, 90 parts by weight of acrylonitrile, 0.8 part by weight of t-butyl peroctoate, 0.8 part by weight of dilauroyl peroxide, 0.4 part by weight of di-t-butyl peroxide and 0.2 part by weight of t-dodecyl mercaptan, the solution being almost completely taken up by the polymers, accompanied by swelling.

200 parts by weight of water are then added (the same result of the tests is also obtained when no water is used) and the temperatures are increased with continued stirring first to 70° C., then to 80° C., then to 90° C. and finally to 98° C. (over a period of 30 minutes in each case) and are left at that level for about 2 hours. Thereafter, the product is cooled, filtered and dried for about 12 hours at 80° C.

Variant 6.1–6.5b:

The procedure is exactly the same as described in variant 6.1–6.5a, except that 200 parts of the crosslinked polymers according to Examples 1 to 5, and only 140 parts by weight of styrene and only 60 parts of acrylonitrile are used.

The contents, determined by weighing, of crosslinked polymer gel initially introduced amount to approximately 25% by weight in the case of variant a and to approximately 55% by weight in the case of variant b.

In every case, opaque to almost clear granulate particles are obtained, the polymer combinations obtained with the polymer according to Example 5 being particularly clear.

The following processing tests are then carried out with the polymer combinations of relatively similar appearance thus obtained:

Sheet formation on rolls:
Result: at roll temperatures in the range of from 180° to 230° C., rough sheets can only be obtained from the polymer combinations according to the invention, 6.5a and b. All the other products produced non-coherent, crumbly rolled materials.

Processing in a heated kneader:
Result: kneading is carried out at the same temperatures as rolling. In this case, too, it is only the products according to the invention, 6.5a and b, which can be processed into a kneaded cake.

Moulding at elevated temperature:
Result: the non-kneadable granulates and the granulated rolled sheets and kneaded cakes were used for this test at temperatures of from 180° to 250° C. Only non-coherent crumbly moulded sheets with minimal material flow were obtained from the products according to 6.1–6.4a and b, irrespective of temperature. By contrast, opaque-cloudy, extremely tough moulded sheets with good material flow and with a smooth glossy surface were obtained from the polymer combinations according to the invention at a mould temperature of as low as 190° C. These sheets are extremely tough and do not break in an impact strength test carried out at 20° C. in accordance with DIN 53 453.

The comparative tests described above demonstrate the unexpected exceptional properties of the polycarbodiimide-containing polymer combinations according to the invention.

These findings can also be confirmed by mixing tests:

EXAMPLE 7

Variants 7.1–7.5:

The polymer combinations produced in accordance with Examples 6.1–6.5b, containing approximately 51% by weight of polymer gel initially introduced, are intensively kneaded for about 10 minutes at 200° C. in a heated kneader with the same quantity of a standard commercial grade copolymer of approximately 25% by weight of acrylonitrile and approximately 75% by weight of styrene. 2 mm thick sheets are then moulded at 200° C. from the kneaded cake obtained, in the same way as in Example 6.

Testing shows that the sheets produced from the polymer combinations according to 6.1–6.4b are non-homogeneous and are all extremely brittle and have no flexural strength. It is only the sheets produced from mixtures which contain the polymer combinations according to the invention, 6.5b, which, once again, have the uniformly toughened homogeneous character which was brought out in Example 6.

Test results similar to those reported in Examples 6 and 7 are obtained when the vinyl polymerisation reaction is carried out in the absence of the t-dodecyl mercaptan which acts as a regulator.

EXAMPLE 8

In Examples 6 and 7, the process according to the invention was illustrated with reference to a trifunctional polyether as a polymer segment for the polycarbodiimide. The range of variation will now be demonstrated with reference, by way of example, to a polycarbodiimide synthesised from polymer segments of different functionality and different chemical character, namely a bifunctional polyester (hereinafter referred to as polymer segment C). The polyester is synthesized from adipic acid and diethylene glycol, is OH-terminated with an OH-number of about 40, and has a molecular weight of about 2800.

The polymer segment C is now converted as follows by way of the corresponding isocyanate prepolymer (hereinafter referred to as prepolymer C) into the polycarbodiimide C:

Prepolymer C 2000 parts by weight of polymer segment C are thoroughly stirred with 260 parts by weight of the isocyanate used in Example 1 and the resulting mixture is stirred for 3 hours at 60° C. in the absence of moisture. Prepolymer C, with an isocyanate content of 3.2% by weight, as determined by titration, is formed.

Polycarbodiimide C 500 parts by weight of prepolymer C are thoroughly stirred with 4 parts by weight of 1-methyl-1-oxophospholine and the resulting mixture is left standing for about 20 hours at 70° C. The polycarbodiimide C formed is then granulated. The granulate is then converted in accordance with Example 6.5a and b with styrene and acrylonitrile into a polymer combination according to the invention.

The dried granulate is almost clear and, in accordance with variant a and b, contains approximately 25% by weight and 50% by weight, respectively, of the polycarbodiimide. The granulates are readily kneaded at 200° C. into a cake, resulting in the formation of an opaque-cloudy material from the relatively clear granulate. Thereafter, the cake is readily moulded at 200° C. into tough-rigid to tough plates with a homogeneous character.

The 50% combination polymer (variant b) may be mixed in accordance with Example 7.5 with the same quantity by weight of styrene-acrylonitrile copolymer, and once again gives high impact mouldings.

Similar observations are also made in similar tests in which other polycarbodiimides differing in structure are produced as follows and converted into polymer combinations in accordance with Example 6.5a and b (cf. Examples 9–19):

EXAMPLE 9

Polycarbodiimide A

Polymer segment A is converted into prepolymer A in accordance with Example 4. 500 parts by weight thereof are thoroughly stirred with 4 parts by weight of 1-methyl-1-oxophospholine and the resulting mixture is left standing for about 20 hours at 70° C., resulting in the formation of the soft polycarbodiimide polymer.

EXAMPLE 10

Mixed Polycarbodiimide D 250 parts by weight of prepolymer A and 250 parts by weight of prepolymer B are mixed. The resulting mixture is stirred with 4 parts by weight of 1-methyl-1-oxophospholine and is then left standing for 18 hours at 70° C.

EXAMPLE 11

Polycarbodiimide E 250 parts by weight of prepolymer B and 250 parts by weight of prepolymer C are intensively stirred at 60° C. 4 parts of 1-methyl-1-oxophospholine are added to the resulting mixture, followed by stirring until gelation occurs. The gel is then left standing for about 20 hours at a temperature of 70° C.

EXAMPLE 12

Polycarbodiimide F 900 parts by weight of a standard commercial-grade OH-terminated polybutadiene oil, with an OH-number of approximately 39 and a molecular weight of approximately 2700, are converted into the prepolymer F by stirring for 30 minutes at 80° C. with 193 parts by weight of 4,4'-diphenyl methane diisocyanate. 600 parts of the prepolymer F are then thoroughly stirred with 6 parts of 1-methyl-1-oxophospholine and the resulting mixture is kept under nitrogen for about 20 hours at 60° C., polycarbodiimide F being formed with elimination of $CO_2$. This material is eminently suitable for use as a mixture component according to Example 27c.

EXAMPLE 13

Polycarbodiimide G 600 parts by weight of a linear dimethyl polysiloxane with terminal hydroxyl propyl groups (produced by reacting the corresponding α,σ-dichloropolydimethyl siloxane with propylene glycol in the presence of trimethylamine as HCl-binder), with an OH-number of approximately 70 and a molecular weight of approximately 1600, are converted into prepolymer G by stirring for about 4.5 hours at 80° C. with 133 parts by weight of the isocyanate mentioned in Example 1. 500 parts by weight of this prepolymer G are converted into polycarbodiimide G by stirring with 4 parts by weight of 1-methyl-1-oxophospholine and heating for 20 hours at 65° C.

EXAMPLE 14

Polycarbodiimide H 300 parts by weight of prepolymer B and 200 parts by weight of prepolymer G are mixed with intensive stirring, followed by the addition of 4 parts by weight of 1-methyl-1-osophospholine oxide. The mixture is stirred at 65° C. until gelation occurs and is then left standing under nitrogen for about 24 hours at 60° C., resulting in the formation of polycarbodiimide H.

EXAMPLE 15

Polycarbodiimide I 1400 parts by weight of polymer segment B are reacted with stirring over a period of 4.75 hours at 80° C. with 340 parts by weight of 4,4'-diphenyl methane diisocyanate to form prepolymer I. The isocyanate content amounts to 4.7% by weight as determined by titration. Prepolymer I is converted into polycarbodiimide I in the usual way at 70° C. with 0.8% by weight of 1-methyl-1-oxophospholine. Polycarbodiimide I is obtained with heavy foaming and can readily be granulated.

EXAMPLE 16

Polycarbodiimide K 1400 parts by weight of polymer segment B are stirred for 7.5 hours at 80° C. with 207 parts by weight of 1,6-hexamethylene diisocyanate, prepolymer K being obtained with an isocyanate content of 5.7% by weight. 500 parts by weight thereof are thoroughly stirred under nitrogen with 8 parts by weight of 1-methyl-1-oxophospholine and kept at 30° C. for more than 150 hours, resulting in the formation of polycarbodiimide K.

EXAMPLE 17

Polycarbodiimide L 2000 parts by weight of a hexane diol polycarbonate, with a molecular weight of approximately 2800 and an OH-number of approximately 40, are converted into prepolymer L by stirring for 2.5 hours at 62° C. with 260 parts by weight of the isocyanate mentioned in Example 1. Prepolymer L contains approximately 3.7% by weight of NCO. 16 parts by weight of 1-methyl-1-oxophospholine are then added, and the mixture is left standing for about 7 hours at 70° C. after the beginning of gelatin. Thereafter, the polycarbodiimide L formed can be granulated.

EXAMPLE 18

Polycarbodiimide M

As in Example 17, 1000 parts by weight of a polytetrahydrofuran with a linear structure and an OH-number of approximately 80 are reacted to form polycarbodiimide M.

EXAMPLE 19

Polycarbodiimide N 1290 parts of a glycerol-started trifunctional copolyether of approximately 72% by weight of ethylene oxide and approximately 28% by weight of propylene oxide with terminal OH-groups, a molecular weight of approximately 6000 and an OH-number of approximately 28 (polymer segment N), are converted into prepolymer N over a period of 190 minutes at 75° C. with 208 parts of the isocyanate mentioned in Example 1. NCO-content (as determined by titration): 4.5% by weight. 500 parts by weight of prepolymer N are then thoroughly stirred with 4 parts by weight of 1-methyl-1-oxophospholine and the resulting mixture is left standing for 14 hours at 70° C., resulting in the formation of polycarbodiimide N.

Polymer combinations produced with this polycarbodiimide N, in accordance with Example 6.5a and b, and mixtures thereof, for example with styrene-acrylonitrile copolymers, can be processed in accordance with Example 7.5 into films suitable for use as osmotic membranes.

EXAMPLE 20

The production of the polymer combinations according to the invention has been described in previous Examples with reference to preformed polycarbodiimide. Their production by simultaneous polycarbodiimide formation and polymerisation is therefore now described by way of example in the following:

300 parts by weight of prepolymer B are thoroughly stirred at 60° C. with a solution of 210 parts by weight of styrene, 90 parts by weight of acrylonitrile, 0.8 part by weight of azodiisobutyronitrile, 0.8 part by weight of t-butyl peroctoate and 0.5 part by weight of dicumyl peroxide, followed by the addition of 3.5 parts by weight of 1-methyl-1-oxophospholine and then by stirring at 60° C. until gelation begins. This is followed by heating for 1 hour to 70° C., for 1 hour to 80° C. and then for 1 hour to 90° C., polymerisation being completed by maintaining the temperature for 3 hours at 120° C. An opaque material containing a few bubbles is formed. This material is granulated and may readily be processed on a roll at 200° C. Tough-elastic sheets with an opaque-cloudy appearance can be produced therefrom at 220° C. in a screw injection moulding machine and, because they can be welded with hot air or by ultrasonic welding, they may be used for the lining of vessels.

EXAMPLE 21

The procedure is as described in Example 20, except that the quantity of prepolymer B is doubled. The polymer formed is similar to that obtained in accordance with Example 20, but is considerably softer. It can be calendered into films, moulded into sealing rings or used for the extrusion of sealing profiles.

EXAMPLE 22

The procedure is as described in Example 20, except that the amount of prepolymer B is tripled. The polymer combination obtained can be moulded into soft sheets with a rubber-like feel which are used for the production of sealing material.

EXAMPLE 23

Variants 23a–c:

100 parts by weight of prepolymer A (variant 23a), 100 parts of prepolymer B (variant 23b) and 100 parts by weight of prepolymer C (variant 23c) are introduced into an autoclave. A solution of 1 part by weight of 1-methyl-1-oxophospholine and 0.35 part by weight of azodiisobutyronitrile in 100 parts by weight of vinyl chloride is then added. This is followed by heating for 2 hours to 60° C., then to 70° C. and finally for 4 hours to 75° C., while stirring with a powerful stirrer. The powerful stirrer breaks up the gel formed so that, after cooling, a polymer granulate is obtained and may readily be processed on a roll at about 200° C. for admixture with stabilisers and pigments. The combination polymer may be calendered into flexible films which are used for lining vessels. In addition, it can be mixed with more PVC and provides the PVC with improved strength.

EXAMPLE 24

100 parts by weight of granulated polycarbodiimide D are swollen under nitrogen for 2 hours with a solution of 30 parts by weight of acrylonitrile, 70 parts by weight of styrene, 3 parts by weight of acrylic acid and 1 part by weight of t-butyl peroctoate. This is followed by heating with vigorous stirring for 8 hours to 70° C. and then for 1 hour to 95° C., as a result of which polymerisation takes place. The resulting polymer may be moulded at about 210° C. into flexible sheets which have an opaque character and which may be used as a sealing material.

EXAMPLE 25

In accordance with Example 24, 100 parts by weight of granulated polycarbodiimide E are converted into a polymer combination according to the invention with a solution of 25 parts by weight of acrylonitrile, 70 parts by weight of styrene, 5 parts by weight of hydroxy ethylene methacrylate and 1 part by weight of t-butyl peroctoate. Homogeneous moulded sheets and sealing rings can be produced from the material.

EXAMPLE 26

Variants a–e:

The possibility of using a variety of different vinyl monomers for producing the polymer combinations according to the invention is described in the following with reference to one type of polycarbodiimide:

100 parts by weight of the granulated polycarbodiimide B are uniformly wetted and swollen while stirring under nitrogen with a solution of 0.3 part by weight of azodiisobutyronitrile, 0.2 part by weight of dilauroyl peroxide, 0.3 part by weight of t-butyl peroctoate and 0.1 part by weight of dicumyl peroxide in 100 parts by weight of the corresponding monomer. After a swelling time of 2 hours, the temperature is continuously increased to 95° C. over a period of 4 hours with vigorous stirring to ensure that the swollen granulate particles are whirled around in the reaction vessel. The temperature is left at that level for about 2 hours. Polymerisation is then over and the polymer combination, present in granulate form, can be removed from the reactor. In every case, the material can be processed in a kneader at temperatures of from 170° C. to 240° C., i.e. it can be provided with dyes, lubricants, stabilisers or mixed with other polymers. The additive-free kneading cakes thus obtained are moulded into approximately 1.5 mm thick panels and assessed as follows:

| No. 26a: | monomer: | acrylonitrile |
|---|---|---|
| | granulate: | clear, yellowish |
| | moulded panel: | opaque, tough |
| No. 26b: | monomer: | methyl methacrylate |
| | granulate: | clear, pale yellowish |
| | moulded panel: | clear, tough |
| No. 26c: | monomer: | vinylacetate |
| | granulate: | clear, yellowish |
| | moulded panel: | clear soft |
| No. 26d: | monomer: | styrene |
| | granulate: | opaque, whitish |
| | moulded panel: | opaque, tough |

No. 26e:

The material obtained in accordance with 26b may be mixed on a roll with the same quantity by weight of a copolymer of 28% by weight of cyclohexyl methacrylate and 72% by weight of methyl methacrylate, resulting in the formation of transparent, calendered sheets having improved toughness compared with the pure copolymer. If polycarbodiimide K is used instead of polycarbodiimide B, the transparent sheets may be used as light-permeable covers.

EXAMPLE 27

Variants a–e:

It is intended in the following to show that polymer combinations of the type according to the invention can also be produced by straightforward mixing processes:

No. 27a:

100 parts by weight of polycarbodiimide E are kneaded with 100 parts of a standard commercial-grade ethylenemethacrylic acid copolymer, in which approximately 10% of methacrylic acid are incorporated, approximately 70% again being present in the form of the alkali metal salt. A kneaded cake is formed at approximately 200° C. and can be moulded into clear tough panels. A clearly compatible polymer combination has formed and may be used as an adhesion promoter.

No. 27b:

The procedure is as described in 27a, except that a copolymer of 45% by weight of vinylacetate and 55% by weight of ethylene is used. Opaque flexible mixtures with a rubber-like feel are obtained.

No. 27c:

100 parts by weight of polycarbodiimide I are kneaded at approximately 200° C. with 200 parts by weight of a copolymer of 25% of acrylonitrile and 75% by weight of styrene. Panels having improved toughness in comparison with the styrene-acrylonitrile copolymer can be produced from the mixture.

No. 27d:

100 parts by weight of cellulose acetobutyrate are kneaded at approximately 180° C. with 50 parts by weight of polycarbodiimide E. Translucent mouldings can be obtained from the kneaded cake.

No. 27e:

100 parts by weight of polycarbodiimide I are kneaded at 240° C. with 150 parts by weight of a standard commercial-grade polycarbonate based on 4,4'-dihydroxy diphenyl dimethyl methane. The kneaded cake is then granulated and moulded into sheets at 220° C. The sheets are opaque and tough and may be used as a semi-finished product for the production of deep-drawn parts.

No. 27f:

100 parts by weight of polycarbodiimide C are kneaded at 230° C. with 200 parts by weight of the polycarbonate used in Example 27e. A homogeneous opaque polymer mixture is obtained and can be moulded at 220° C. into tough sheets which are suitable for the production of high-impact protective panels.

No. 27g:

100 parts by weight of a standard commercial-grade copolymer of approximately 27% by weight of acrylonitrile and 73% by weight of styrene are kneaded with 100 parts by weight of the polymer material obtained in accordance with Example 26c. An opaque homogeneous high-impact polymer combination is obtained at 200° C. and can be extruded at 210° C. into profiled strips.

No. 27h:

100 parts by weight of high pressure polyethylene are mixed on a roll at 200° C. with 30 parts by weight of polycarbodiimide F. A polymer combination is formed and can be moulded at 200° C. into substantially clear sheets. Although these sheets are homogeneous in a thickness of approximately 1.5 mm, they give a fibrous fracture in a tensile test.

No. 27i:

1700 parts by weight of polymer segment C are stirred for 3.25 hours at 80° C. with 426 parts by weight of 4,4'-di-phenyl methane diisocyanate, resulting in the formation of a prepolymer with an NCO-content of approximately 4.6%. This prepolymer is stirred with 0.8% by weight of 1-methyl-1-oxophospholine and the resulting mixture is left standing overnight at 80° C. A soft, partly foamed polycarbodiimide gel is formed. The gel thus obtained is finely granulated. 25 parts by weight of this polycarbodiimide are thoroughly mixed on a roll at about 200° C. with 75 parts by weight of a copolymer of approximately 72 parts by weight of styrene and approximately 28 parts by weight of acrylonitrile. The mixture can be moulded at 200° C. into opaque sheets with an impact strength as measured at room temperature of 72 KJ/m$^2$. If mixing is carried out in a ratio by weight of 1:1, extremely flexible, opaque and homogeneous sheets are obtained.

EXAMPLE 28a

This Example is intended to illustrate the use of a modified polycarbodiimide as a mixture component:

70 parts by weight of prepolymer B are thoroughly mixed at approximately 60° C. with 30 parts by weight of 4,4'-di-phenyl methane diisocyanate. 0.8 part by weight of 1-methyl-1-oxophospholine is then added with stirring and the reaction mixture is left standing for 20 hours at 68° C. A flexible foam is formed. It is granulated and used as a mixture component.

25 parts by weight of the mixture component and 75 parts by weight of the standard commercial-grade polycarbonate used above (27e) are thoroughly mixed under nitrogen on a roll stand at a temperature of 240° C. The sheet obtained is granulated and may subsequently be moulded at approximately 210° C. into opaque tough sheets.

EXAMPLE 28b

The procedure is exactly the same as described in Example 20, except that 50 parts by weight of 4,4'-diphenylmethane diisocyanate are additionally dissolved in the vinyl monomer solution. The polymer combination is formed in accordance with Example 20. However, the material obtained has to be processed on a roll at a somewhat higher temperature, approximately 220° C. The sheets obtained after moulding of the kneaded material at 220° C. show greater hardness than the material obtained in test 20, coupled with high toughness.

EXAMPLE 29

100 parts by weight of polycarbodiimide B are swollen with a solution of 50 parts by weight of the isocyanate used in Example 1, 40 parts by weight of acrylonitrile, 60 parts by weight of styrene, 0.3 part by weight of dilauroyl peroxide, 0.5 part of t-butyl peroctoate and 0.5 part of 1-methyl-1-oxophospholine. The swollen granular material is heated in a rotating autoclave drum, filled with nitrogen as inert gas, for 1 hour at 60° C., for 1 hour at 70° C., for 1 hour at 80° C., for 1 hour at 90° C. and then for 3 hours at 96° C., as a result of which polymerisation takes place. A hard opaque granulate is obtained and may be processed on a roll at 220° C. to form a homogeneous opaque sheet. Tough sheets are moulded from the homogenised material at 210° C. and may be used as a starting material for the deep drawing of mouldings or may be machined.

EXAMPLE 30

100 parts by weight of a solution of 1 part by weight of di-t-butyl peroxide and 60 parts by weight of a polyester of substantially equal molar quantities of 1,2-propylene glycol and maleic acid in 40 parts by weight of styrene, are thoroughly mixed with 50 parts by weight of prepolymer C and 0.5 part by weight of 1-methyl-1-oxophospholine. The mixture is then left to gel at 60° C. with polycarbodiimide formation, a foamy material being formed. It is size-reduced. The granulate obtained can be moulded at 200° C. into clear tough sheets with simultaneous polymerisation of the styrene present in it.

A similar result can also be obtained by using prepolymer B instead of prepolymer C.

If, as in the latter case, prepolymer B is used and if an initiator active at relatively low temperatures, such as azodiisobutyronitrile, is used instead of the di-t-butyl peroxide which is only active as a radical initiator at elevated temperature, polymerisation of the styrene with the unsaturated polyester takes place simultaneously with the foaming of the mixture at a temperature of about 70° C. A tough semi-rigid foam is obtained and may be used as a shock-absorbing material.

EXAMPLE 31

1700 parts by weight of polytetrahydrofuran (bifunctional, molecular weight approximately 2000) are stirred for 2.75 hours at 80° C. with 500 parts by weight of 4,4'-diphenylmethane diisocyanate. The prepolymer formed, which is still liquid, is then thoroughly stirred with 20 parts by weight of 1-methyl-1-oxophospholine and the resulting mixture is left standing for 15 hours at approximately 70° C. The soft polycarbodiimide formed is granulated.

200 parts by weight of the granulate are intensively stirred and at the same time swollen with a solution of 0.2 part by weight of t-dodecyl mercaptan, 0.8 part by weight of dilauroyl peroxide, 0.4 part by weight of dibenzoyl peroxide and 0.8 part by weight of t-butyl peroctoate in 200 parts by weight of methyl methacrylate. 300 parts by weight of water are then added, followed by stirring for 30 minutes at 70° C., for 30 minutes at 80° C., for 30 minutes at 90° C. and then for 2.5 hours at 95° C. The polymer granulate formed is dried at 80° C. in a recirculating air drying cabinet and is found by weighing to contain 50% by weight of the polycarbodiimide.

The granulate is homogenised in a kneader at 200° C. and then moulded into sheets. The sheets obtained are clear in layer thicknesses of 3 mm. They are also flexible and tough and are suitable for use as sole material (in the shoe industry) and for the production of closure caps. If 25 parts by weight of the polymer are kneaded at 200° C. with 75 parts by weight of a standard commercial-grade copolymer of 28 parts by weight of acrylonitrile and 72 parts by weight of styrene, a polymer combination is obtained which may be injection-moulded or moulded into sheets having an opaque-homogeneous character, extreme hardness and high toughness.

We claim:

1. A thermoplastic processible polymer system comprising a homogeneous mixture of (A) from 0.5 to 95% by weight of a polycarbodiimide obtained by the catalyzed intermolecular elimination of $CO_2$ from an isocyanate prepolymer having a molecular weight of from 500 to 10,000 and obtained by reacting a polyisocyanate with at least one member selected from the group consisting of polyesters and polyethers and (B) 99.5 to 5% by weight of a thermoplastic polymer selected from the group consisting of copolymers of styrene and acrylonitrile, ABS-polymers, polyacrylates, polymethacrylates, polyphenylene ethers, polystyrene, polyacetals, polycarbonates, polyurethanes, polyamides, polyolefins and copolymers of ethylene and vinylacetate.

2. The polymer system of claim 1 wherein (A) has a glass transition temperature below 0° C.

* * * * *